United States Patent
Taccari et al.

(10) Patent No.: US 12,266,180 B2
(45) Date of Patent: Apr. 1, 2025

(54) SYSTEMS AND METHODS FOR GENERATING A VIDEO SUMMARY OF VIDEO DATA

(71) Applicant: Verizon Patent and Licensing Inc., Basking Ridge, NJ (US)

(72) Inventors: Leonardo Taccari, Florence (IT); Aurel Pjetri, Florence (IT); Alessio Sanfratello, Florence (IT); Tommaso Innocenti, Florence (IT); Tommaso Mugnai, Figline e Incisa Valdarno (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 404 days.

(21) Appl. No.: 17/931,289

(22) Filed: Sep. 12, 2022

(65) Prior Publication Data

US 2024/0087319 A1  Mar. 14, 2024

(51) Int. Cl.
*G06V 20/40* (2022.01)
*G06V 20/56* (2022.01)
*G08G 1/04* (2006.01)

(52) U.S. Cl.
CPC .............. *G06V 20/47* (2022.01); *G06V 20/41* (2022.01); *G06V 20/44* (2022.01); *G06V 20/56* (2022.01); *G08G 1/04* (2013.01)

(58) Field of Classification Search
CPC ........ G06V 20/47; G06V 20/41; G06V 20/44; G06V 20/56; G06V 10/82; G08G 1/04
See application file for complete search history.

(56) References Cited

U.S. PATENT DOCUMENTS

| | | | |
|---|---|---|---|
| 2004/0170321 A1* | 9/2004 | Gong | G06F 16/785 382/173 |
| 2012/0099793 A1* | 4/2012 | Kumar | G11B 27/034 382/190 |
| 2016/0070962 A1* | 3/2016 | Shetty | G06F 16/7834 382/225 |

FOREIGN PATENT DOCUMENTS

CN  104063883 A  *  9/2014

OTHER PUBLICATIONS

Vasudevan, Arun Balajee, Michael Gygli, Anna Volokitin, and Luc Van Gool. "Query-adaptive video summarization via quality-aware relevance estimation." In Proceedings of the 25th ACM international conference on Multimedia, pp. 582-590. 2017. (Year: 2017).*

* cited by examiner

*Primary Examiner* — Carol W Chan

(57) ABSTRACT

A video summary device may determine, based on video data, a plurality of events that occurred during a period of time. The video summary device may determine first measures of relevance of a plurality of portions of the period of time. A first measure of relevance of a portion of time may be determined based on one or more events of the plurality of events. The video summary device may determine second measures of relevance of a plurality of ranges of time between different portions of time of the plurality of portions of the period of time. The second measures of relevance is determined based on the first measures of relevance determined for the different portions of time. The video summary device may determine particular frames of the video data, as a video summary of the video data, based on the second measures of relevance.

20 Claims, 9 Drawing Sheets

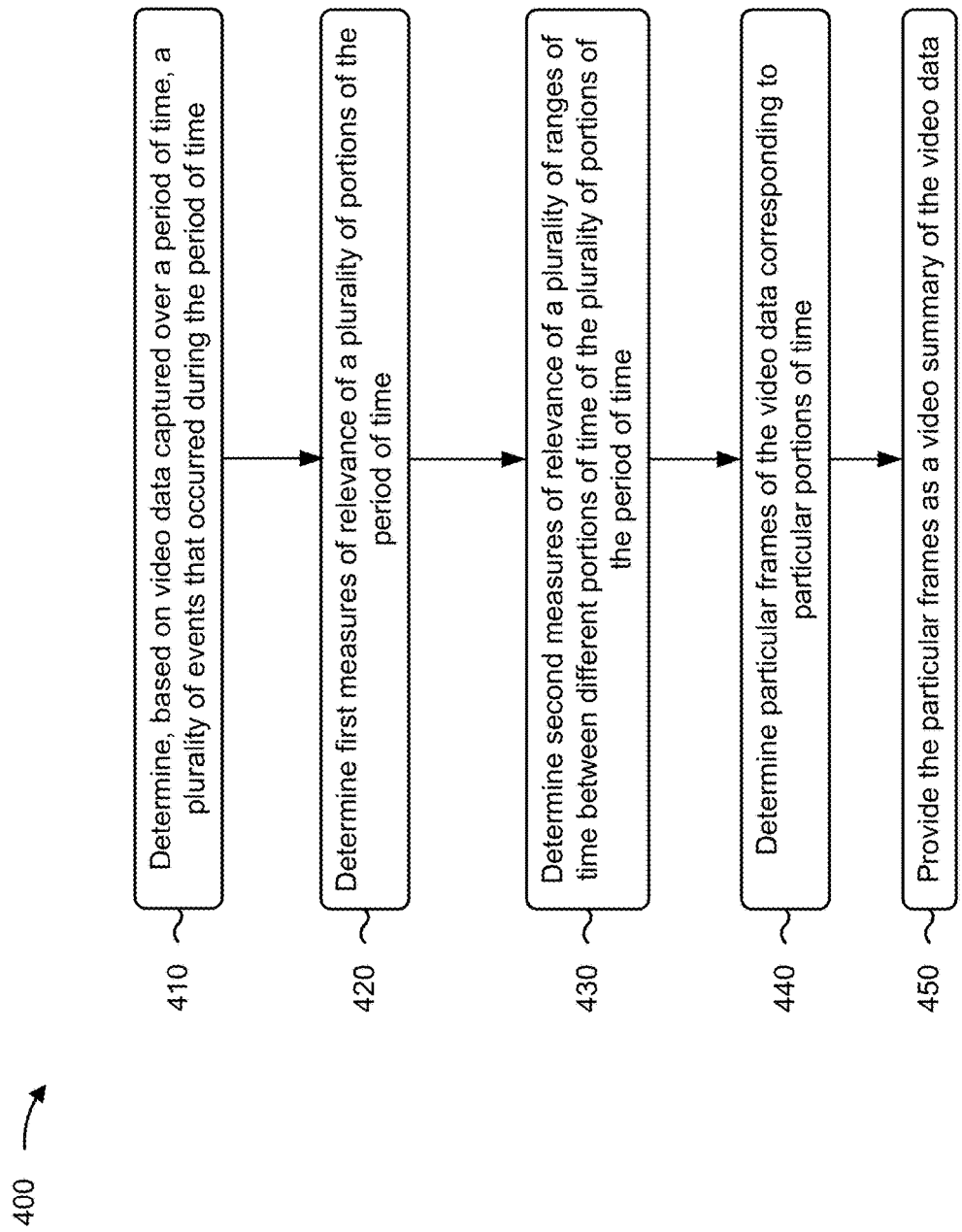

SYSTEMS AND METHODS FOR GENERATING A VIDEO SUMMARY OF VIDEO DATA

BACKGROUND

A dash cam is a camera device provided on a dashboard of a vehicle. The dash camera continuously captures video data of a view of a road outside the vehicle or a view inside the vehicle. A dash cam may include a built-in microphone to record audio data along with the video data.

BRIEF DESCRIPTION OF THE DRAWINGS

FIG. 4 is a flowchart of an example process relating to generating a video summary of video data.

DETAILED DESCRIPTION OF PREFERRED EMBODIMENTS

Figure 1A:
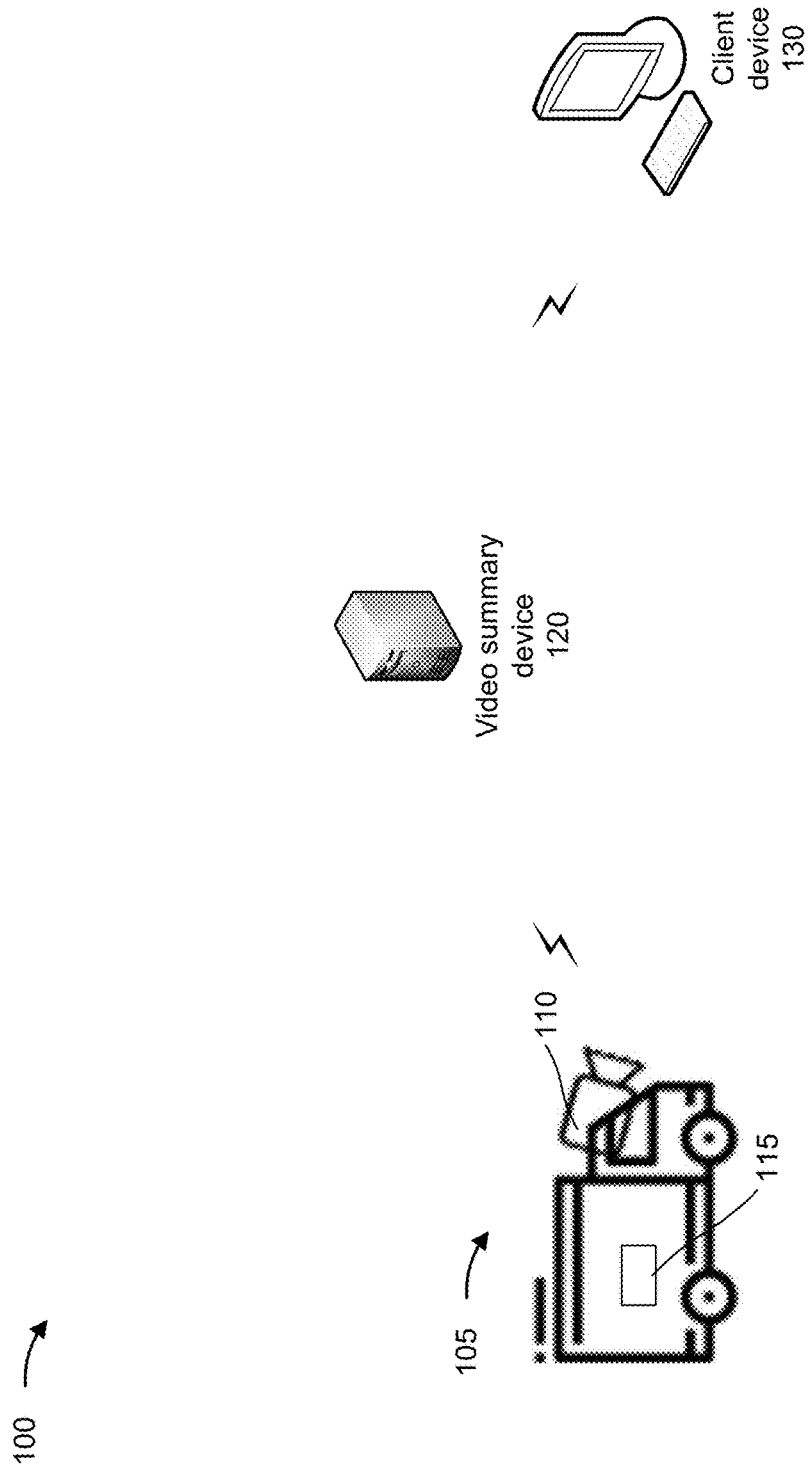
FIGS. 1A-1F are diagrams of an example associated with generating a video summary of video data.

The following detailed description of example implementations refers to the accompanying drawings. The same reference numbers in different drawings may identify the same or similar elements.

A camera device, of a vehicle, may capture a video of an operation of the vehicle over a period of time. The video may be provided to a user device of a user associated with the vehicle. In some examples, the user may manage and/or own a fleet of vehicles that includes the vehicle. The video may be provided to the user device to enable the user to review the video and identify relevant events that occurred during the operation of the vehicle over the period of time.

Typically, the user device may receive the video and other videos capturing the operation of the vehicle and an operation of one or more other vehicles of the fleet of vehicles. A length of each video may be substantial (e.g., tens of seconds, one or more minutes, and/or one or more hours, among other examples). Accordingly, the size of each video may be substantial (e.g., hundreds of megabytes, tens of gigabytes, and/or hundreds of gigabytes, among other examples).

Therefore, using the user device to process each video and to review the content of each video is a time-consuming process. Additionally, using the user device to process each video and review the content of each video consumes network resources associated with providing the videos, consumes storage resources associated with storing the videos, and consumes computing resources associated with processing the videos, among other examples.

Implementations described herein are directed to generating a summary of video data captured over a period of time. In some examples, a video summary device may determine a measure of relevance of each portion of time of the period of time. Each portion of time may correspond to one or more frames of the video data. As an example, the video summary device may determine the measure of relevance for a portion of time based on one or more events that occurred during the portion of time.

The video summary device may determine a measure of relevance of different ranges of time of a plurality of ranges of time. The plurality of ranges of time may be ranges of time between different portions of time of the period of time. The measure of relevance of a range of time may be determined based on the measure of relevance of each portion of time included in the range of time and based on a length of the range of time.

The video summary device may identify a particular range of time associated with a highest measure of relevance of the measures of relevance determined for each range of time. The video summary device may generate a video summary of the video data using frames of the video data, corresponding to the portions of time included in the particular range of time.

By generating the video summary of the video data in this manner, the video summary device may preserve network resources, storage resources, and/or computing resources, among other examples, associated with obtaining, storing, and/or processing video data of a substantial length and a substantial size.

FIGS. 1A-1F are diagrams of an example 100 associated with generating a video summary of video data. As shown in FIGS. 1A-1F, example 100 includes a machine 105, a video summary device 120, and a client device 130. The term "machine" may refer to a device that performs an operation associated with an industry such as, for example, telecommunication, transportation, healthcare, security, and/or construction, among other examples. As shown in FIG. 1A, machine 105 is a vehicle. For example, the vehicle may be a manned vehicle, an autonomous vehicle, or a semiautonomous vehicle.

As shown in FIG. 1A, machine 105 may include one or more camera devices 110 (individually "camera device 110") and a sensor system 115. In some examples, a camera device 110 may be configured to capture video data of a view outside machine 105 (e.g., video data of an environment surrounding machine 105). Additionally, or alternatively, the camera device 110 may be configured to capture video data of a view inside machine 105. In some implementations, the camera device 110 may be a dash camera device.

Sensor system 115 may include one or more devices configured to sense a motion of machine 105 and generate sensor data regarding the motion of machine 105. In some implementations, the one or more devices may include one or more sensor devices, such as one or more inertial measurement units (IMUs). As an example, the one or more IMUs may include a gravity sensor device, a speedometer, an accelerometer, a gyroscope, among other examples.

Sensor system 115 may further include one or more devices configured to determine a location of machine 105 and generate location data indicating the location of machine 105. In some implementations, the one or more devices may include a global positioning system (GPS) unit (e.g., a GPS receiver).

Video summary device 120 may include one or more devices configured to generate a video summary of the video data captured by one or more camera devices 110. For example, video summary device 120 may receive data from machine 105. As an example, the data may include the video data along with the sensor data and/or the location data. Video summary device 120 may generate the video summary based on the data received from machine 105 and provide the video summary to client device 130.

Client device 130 may be configured to receive the video summary generated by video summary device 120 and provide, for display, the video summary to a user associated with client device 130. In some examples, client device 130 may execute an application configured to cause client device 130 to provide the video summary to the user.

Figure 1B:
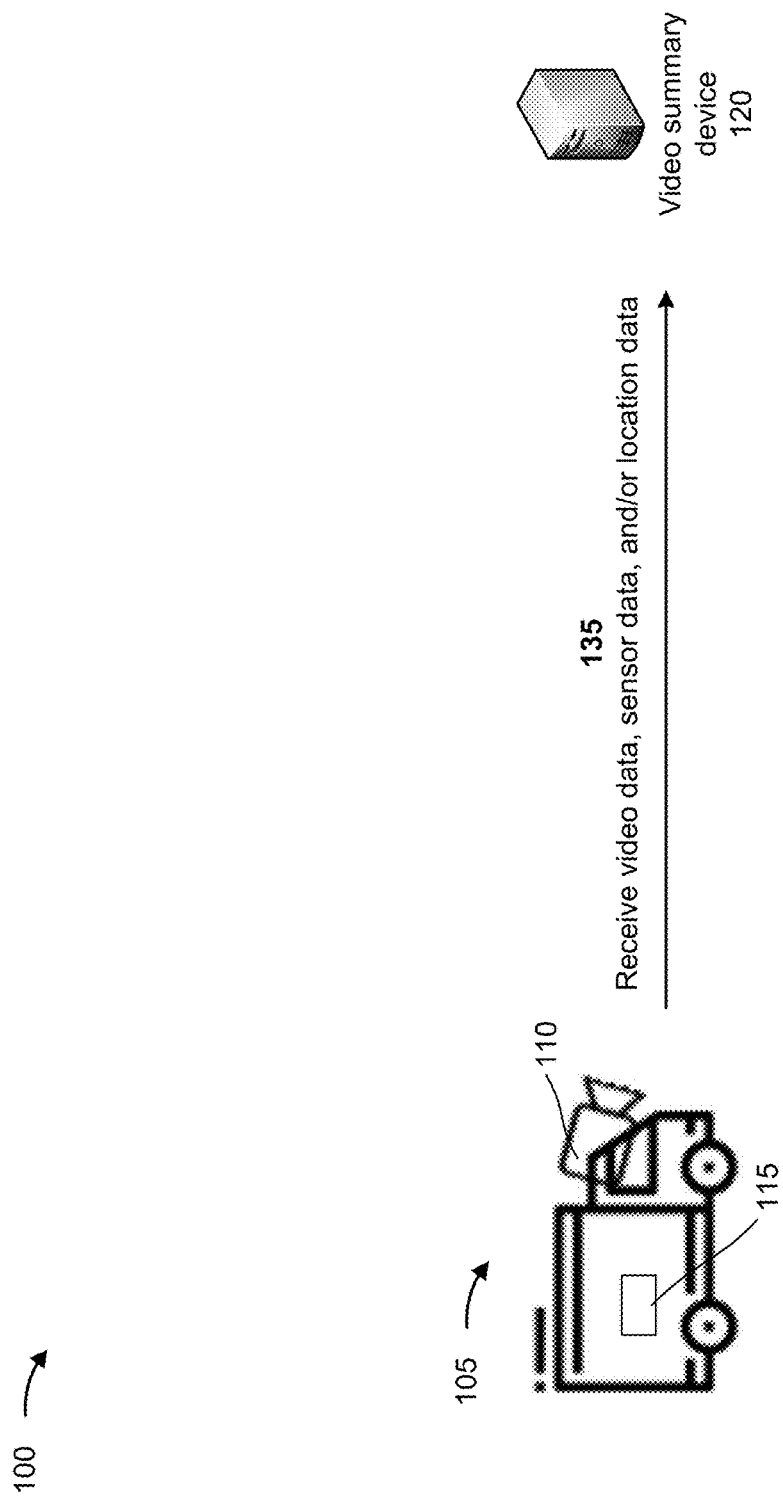

As shown in FIG. 1B, and by reference number 135, video summary device 120 may receive the video data, the sensor data, and/or the location data. For example, video summary device 120 may receive the video data along with the sensor and/or the location data from machine 105 (e.g., from a wireless communication component of machine 105). The video data may be video data of a video that was captured by one or more camera devices 110 during an operation of machine 105 over a period of time. The sensor data may be sensor data obtained by sensor system 115 during the period of time. The location data may indicate one or more locations of machine 105 during the period of time.

In some implementations, video summary device 120 may receive the video, the sensor data, and/or the location data from machine 105 periodically (e.g., every thirty minutes, every hour, every two hours, every three hours, among other examples). Additionally, or alternatively, video summary device 120 may receive the video, the sensor data, and/or the location data from machine 105 based on a trigger (e.g., based on a request provided by video summary device 120 to machine 105, based on providing a request provided by client device 130 to machine 105, or based on an event that occurred during the operation of machine 105, among other examples).

In some examples, the request may be a request to generate a video summary of the video data. In some examples, the event may include a collision of machine 105 with another machine, a sudden deceleration of machine 105, a sudden braking of machine 105, a sudden change in direction of machine 105, an object being detected along a travel path of machine 105, a traffic violation being detected, a distraction of a driver of machine 105 being detected, and/or a measure of fatigue of the driver being detected.

Figure 1C:
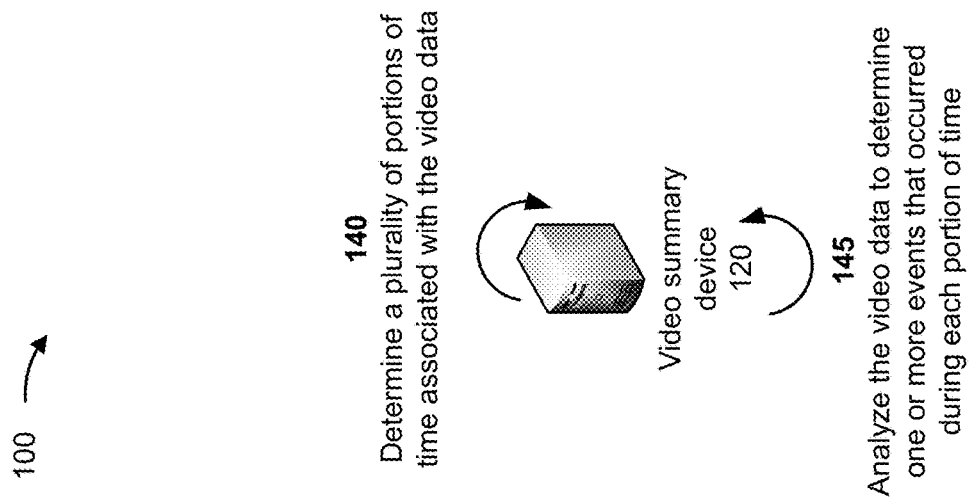

As shown in FIG. 1C, and by reference number 140, video summary device 120 may determine a plurality of portions of time associated with the video data. The plurality of portions of time may be portions of the period of time during which the video data was captured. In some implementations, the plurality of portions of time may be different time intervals (e.g., different periods of time). For example, a portion of time may be a third of a second, a half of a second, or one second, among other examples.

In some implementations, each portion of time may correspond to one or more frames of the video data. The plurality of portions of time may be used to determine portions of the video data to be included in the video summary of the video data (e.g., to determine frames of the video data to be included in the video summary).

As shown in FIG. 1C, and by reference number 145, video summary device 120 may analyze the video data to determine one or more events that occurred during each portion of time. For example, for a particular portion of time of the plurality of portions of time, video summary device 120 may identify a particular portion of the video data corresponding to the particular portion of time. For instance, video summary device 120 may identify one or more frames of the video data corresponding to the particular portion of time.

Video summary device 120 may analyze the particular portion of the video data to determine one or more events that occurred during the particular portion of time. In some implementations, video summary device 120 may analyze the particular portion of the video data using one or more machine learning models.

In some examples, based on analyzing the particular portion of the video data, video summary device 120 may determine that an object detection event occurred during the particular portion of time. The object detection event may indicate a detection of one or more objects during the particular portion of time. Video summary device 120 may detect the one or more objects using one or more object detection algorithms (e.g., a convolutional neural network (CNN), a Single Shot Detector (SSD) algorithm, and/or a You Only Look Once (YOLO) algorithm, among other examples). The one or more objects may include one or more vehicles, one or more pedestrians, and/or one or more animals, among other examples.

In some examples, based on analyzing the particular portion of the video data, video summary device 120 may determine that an acceleration event occurred during the particular portion of time. The acceleration event may indicate an acceleration of machine 105 during the period of time. In some examples, video summary device 120 may determine the acceleration based on the sensor data generated by the one or more IMUs.

In some examples, the acceleration may be a longitudinal acceleration. The longitudinal acceleration may be an acceleration along a longitudinal axis. In some instances, a negative value of the acceleration may correspond to a braking of machine 105, while a positive value of the acceleration may correspond to an acceleration. In some examples, video summary device 120 may determine the magnitude of the acceleration. The magnitude of the acceleration may be a combination of accelerations occurring with respect to the three Cartesian coordinate axes (e.g., a longitudinal axis, a latitudinal axis, and a rotational axis).

In some examples, based on analyzing the particular portion of the video data, video summary device 120 may determine that a distraction event occurred during the particular portion of time. The distraction event may indicate a distraction of an operator of machine 105 (e.g., indicate whether the operator is distracted). Video summary device 120 may determine the distraction event occurred using one or more facial monitoring algorithms (e.g., a facial emotion recognition (FER) algorithm, and/or a face tracking algorithm, among other examples).

In some examples, based on analyzing the particular portion of the video data, video summary device 120 may determine that a drowsiness event occurred during the particular portion of time. The drowsiness event may indicate a measure of drowsiness of the operator of machine 105 (e.g., indicate whether the operator is drowsy and/or sleepy). Video summary device 120 may determine that the drowsiness event occurred using the one or more facial monitoring algorithms discussed above.

In some examples, based on analyzing the particular portion of the video data, video summary device 120 may determine that a traffic violation event occurred during the particular portion of time. The traffic violation event may indicate a traffic violation associated with the operation of machine 105 during the particular portion of time.

In some examples, the traffic violation event may include a speeding event. As example, video summary device 120 may detect an object identifying a speed limit using the one or more object detection algorithms discussed above. Video summary device 120 may determine a speed of machine 105 during the particular portion of time based on the sensor data received from machine 105. Video summary device 120 may determine that the speeding event has occurred based on determining that the speed of machine 105 exceeds the speed limit.

In some examples, the traffic violation event may include a stop sign violation event. As example, video summary device 120 may detect a stop sign using the one or more object detection algorithms discussed above. In some instances, video summary device 120 may use the sensor data to determine whether machine 105 was stationary during the particular portion of time based on the sensor data received from machine 105. For example, video summary device 120 may determine whether machine 105 was stationary within a particular distance from the stop sign. Video summary device 120 may determine that the stop sign violation event has occurred based on determining that machine 105 was not stationary during the particular portion of time.

In some examples, the traffic violation event may include a red light violation event. As example, video summary device 120 may detect that a red light of a traffic light is illuminated using the one or more object detection algorithms discussed above. In some instances, video summary device 120 may use the sensor data to determine whether machine 105 was stationary during the particular portion of time based on the sensor data received from machine 105. For example, video summary device 120 may determine whether machine 105 was stationary within a particular distance from the red light. Video summary device 120 may determine that the red light violation event has occurred based on determining that machine 105 was not stationary during the particular portion of time.

In some examples, based on analyzing the particular portion of the video data, video summary device 120 may determine a safe distance violation event based on an amount of time for machine 105 to reach another vehicle traveling ahead of machine 105. In some implementations, video summary device 120 may determine a speed of machine 105 during the particular portion of time using the sensor data. Additionally, based on analyzing the particular portion of the video data, video summary device 120 may determine a distance between machine 105 and the other vehicle.

Video summary device 120 may determine the amount of time based on the speed of machine 105 and the distance. Video summary device 120 may determine that a safe distance violation event has occurred based on determining that the amount of time does not satisfy a time threshold (e.g., based on determining that machine 105 is too close to the other vehicle). Video summary device 120 may determine one or more events that occurred during other portions of time, of the plurality of portions of time, in a manner similar to the manner described above.

Figure 1D:
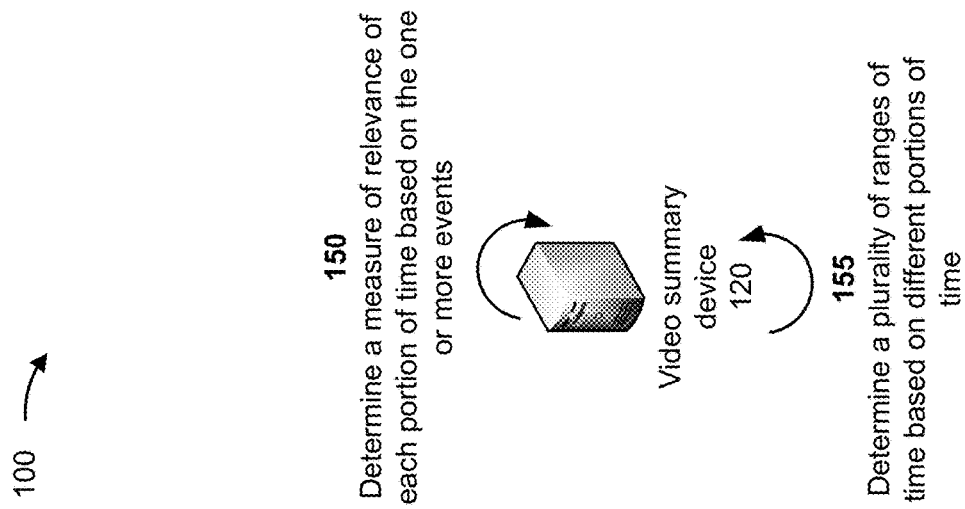

As shown in FIG. 1D, and by reference number 150, video summary device 120 may determine a measure of relevance of each portion of time based on the one or more events. For example, after determining the one or more events that occurred during each portion of time, video summary device 120 may determine the measure of relevance of each portion of time based on the one or more events that occurred during the portion of time. In some implementations, video summary device 120 may determine the measure of relevance of the particular portion of time based on one or more values associated with the one or more events.

In some implementations, a value of an event may be a binary value. For example, a value of 1 may indicate that the event occurred during the period of time while a value of 0 may indicate that the event did not occur during the period of time.

In some implementations, a value of an event may be based on the event. For example, a value of an object detection event may be based on a quantity of objects detected. As another example, a value of an acceleration event may be based on a value of an acceleration of machine 105. As yet another example, a value of the speeding event may be based on a difference between a speed of machine 105 during the particular portion of time and the speed limit.

In some implementations, video summary device 120 may determine the measure of relevance for the particular portion of time based on the following formula:

$$S(t) = \sum_{i=0}^{N-1} \alpha_i e_i(t) + \sum_{i=0}^{N-1}\sum_{j=0}^{N-1} e_i(t) A_{ij} e_j(t)$$

where $S(t)$ represents the measure of relevance of the particular portion of time t,
where $e_i(t)$ represents a value of a particular event $e_i$ at the particular portion of time t,
where i represents a type of event,
where $\alpha_i$ represents a first weight associated with the particular event, and
where $A_{ij}$ represents a second weight associated with a combination of the particular event $e_i$ and another event $e_j$.

As an example, a value of $e_7(10)$ may be 1 if a speeding event (i=7) occurred at a timestamp of t=10. The first term in $S(t)$ may be a linear combination of the values of all of the events that occurred during the particular portion of time weighted by a factor $\alpha_i$. The second term in $S(t)$ may be a quadratic combination of all possible pairs of events (i, j) that occurred during the particular portion of time.

In some examples, the combination of pairs of events may be useful to model second-order interactions between different events. For example, a distraction event may be important only if the distraction event occurs with a speeding event. Accordingly, a value of the combination of the two events may exceed a value of the combination of two other events.

In some implementations, a value of the first weight may be determined by an administrator of video summary device 120. For instance, the value of the first weight may be based on a measure of importance of the event (e.g., a measure of importance as determined by the administrator). A value of the second weight may be determined in a similar manner. For instance, the value of the second weight may be based on a measure of importance of a particular combination of events.

In some implementations, the value of the first weight and the value of the second weight may be determined based on historical data regarding the particular portion of time. For example, the historical data may include historical data regarding a quantity of times that the particular portion of time was viewed by users. The particular portion may be the first ten seconds of video data, the first thirty seconds of video data that was viewed, or the last twenty seconds of video data, among other examples.

The quantity of times that the particular portion of time was viewed by users may be a value $V(t)$. The value $V(t)$ may be a proxy (or an indication) of a measure of relevance of the particular portion of time with respect to the users. Video summary device 120 may generate an optimization problem in which a and A are optimized so that $S(t)$ predicts $V(t)$ as well as possible. In other words, video summary device 120 may minimize a loss (e.g., mean squared error) between $S(t)$ and $V(t)$ using the following formula:

$$\min_{\alpha, A} \|V(t) - S(t)\|^2$$

In some examples, video summary device 120 may minimize the loss using a gradient descent algorithm or similar iterative algorithm. Additionally, or alternatively to determining the value of the first weight and the value of the second weight based on the historical data, the value of the first weight and the value of the second weight may be determined manually. For example, the value of the first weight and/or the value of the second weight may be determined based on input of a user associated with vehicle 105 (e.g., a user that manages and/or owns a fleet of vehicles that includes vehicle 105, a driver of vehicle 105, among other examples).

While the foregoing example refers to the mathematical operations of addition and multiplication, in other examples, other one or more mathematical operations may be used to determine the measure of relevance of the particular portion of time. While the foregoing example refers to a combination of a pair of events, in other examples, different combinations of three or more events may be used to determine the measure of relevance of the particular portion of time. Video summary device 120 may determine the measure of relevance of other portions of time in a similar manner.

As shown in FIG. 1D, and by reference number 155, video summary device 120 may determine a plurality of ranges of time based on different portions of times. For example, after determining the measures of relevance of the plurality of portions of time, video summary device 120 may determine the plurality of ranges of time based on different portions of times. For example, video summary device 120 may determine a first range of time between a first portion of time and a second portion of time, determine a second range of time between the first portion of time and a third portion of time, determine a third range of time between the second portion of time and a third portion of time, and so on.

Figure 1E:
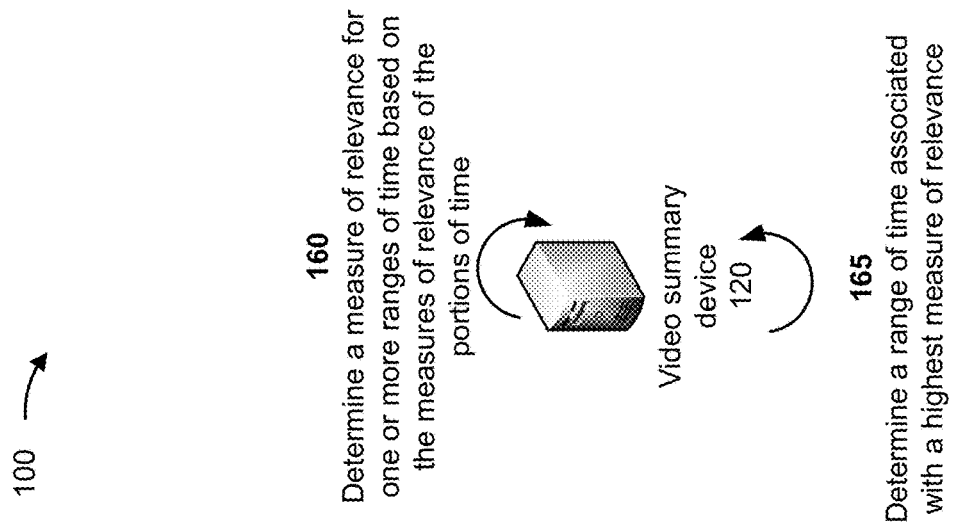

As shown in FIG. 1E, and by reference number 160, video summary device 120 may determine a measure of relevance for one or more ranges of time based on the measures of relevance of the portions of time. For example, video summary device 120 may determine a measure of relevance for the first range of time, determine a measure of relevance for the second range of time, determine a measure of relevance for the third range of time, and so on. In some implementations, video summary device 120 may determine a measure of relevance for each possible range of time of the plurality of portions of time.

Alternatively, video summary device 120 may determine a measure of relevance for ranges of time that are less than a particular length of time. The particular length of time may be determined by the administrator of video summary device 120, determined by the operator and/or an owner of machine 105, determined by the operator of machine 105, determined based on historical data regarding lengths of time of video summaries, among other examples.

By determining the measures of relevance for the ranges of time in this manner, video summary device 120 may preserve computing resources and/or network resources, among other resources that would have been used to determine the measure of relevance for each range of time of the plurality of portions of time. Additionally, by determining the measures of relevance for the ranges of time in this manner, video summary device 120 may ensure that a length (of time) of the video summary does not exceed the particular length of time.

Video summary device 120 may determine the measure of relevance of a particular range of time based on the measures of relevance of the portions of time included in the particular range of time. For example, video summary device 120 may determine the measure of relevance of the particular range of time based on the formula:

$$R(t_1, t_2) = \sum_{t=t_1}^{t_2} S(t) - \beta(t_2 - t_1)^2$$

where R(t) represents the measure of relevance of the particular range of time between $t_1$ and $t_2$,
where t1 and t2 represent portions of time,
where S(t) represents the measure of relevance of a portion of time t, and
where $\beta$ represents a factor associated with a length of time between $t_1$ and $t_2$.

In the above formula, the first term is the sum of S(t) between $t_1$ and $t_2$ that measures a relevance of a portion of the video data between $t_1$ and $t_2$ (e.g., a relevance of the content included in the portion of the video data). In other words, the first term is the sum of the measures of relevance of the portions of time included in the particular range of time between $t_1$ and $t_2$. In the above formula, the second term is a quadratic penalty term that penalizes a length of time between $t_1$ and $t_2$.

The factor may be used to prevent the video summary from including an entirety of the video data. In some implementations, the factor may be based on the particular length of time. In this regard, as the particular length of time decreases, the factor may increase. The formula discussed above may maximize a measure of relevance of a range of time while ensuring a reasonable length of the video summary (e.g., ensuring that the range of time does not exceed the particular length of time). In some examples, the measure of relevance of the range of time may be performed in quadratic time $O(T^2)$. Video summary device 120 may determine the measures of relevance of other ranges of time in a similar manner.

As shown in FIG. 1E, and by reference number 165, video summary device 120 may determine a range of time associated with a highest measure of relevance. For example, after determining the one or more measures of relevance for the one or more ranges of time, video summary device 120 may determine the range of time associated with the highest measure of relevance out of the one or more measures of relevance.

In some instances, video summary device 120 may identify multiple ranges of time associated with the highest measure of relevance. In such instances, video summary device 120 may select a range of time associated with a shortest length. Alternatively, video summary device 120 may select a range of time associated with portions of time associated with highest measures of relevance.

Figure 1F:
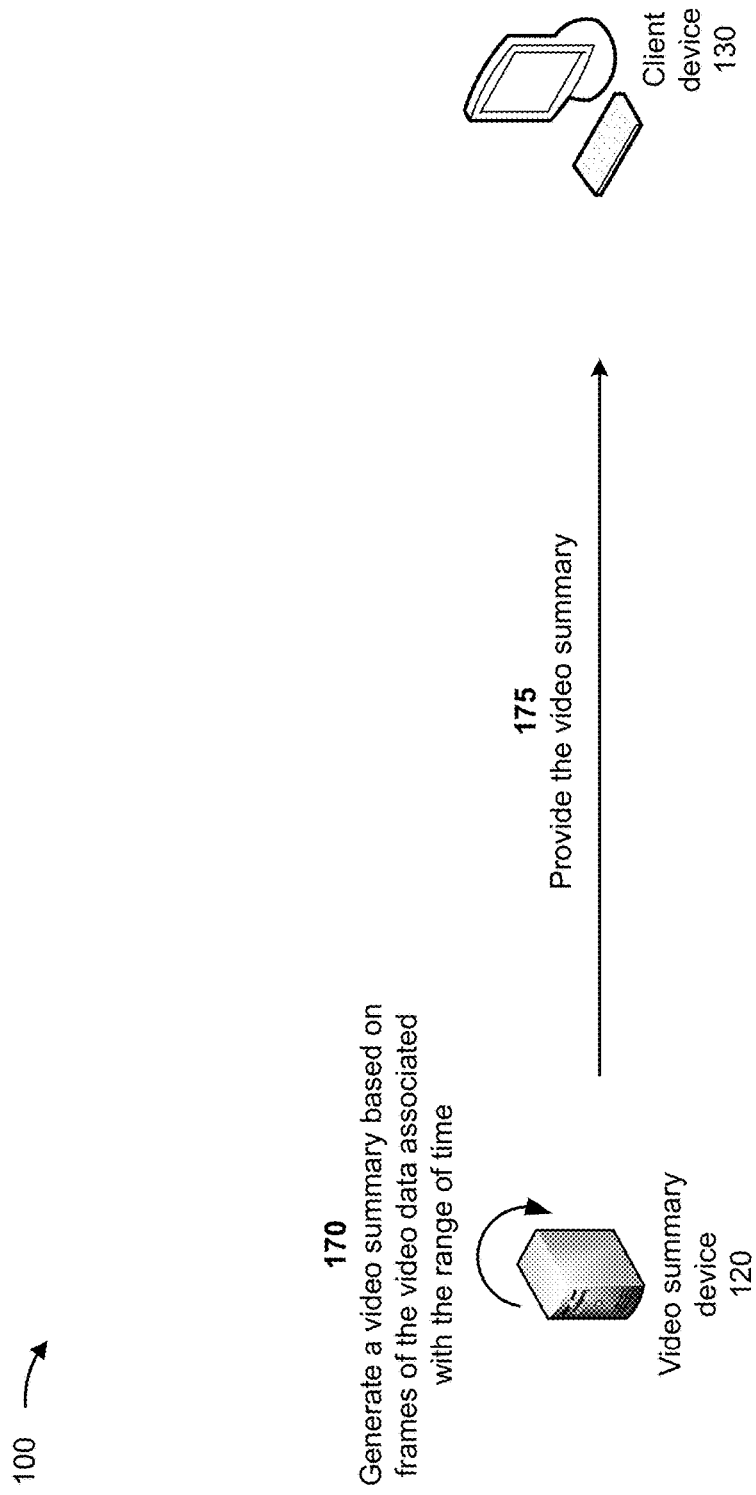

As shown in FIG. 1F, and by reference number 170, video summary device 120 may generate a video summary based on frames of the video data associated with the range of time. For example, video summary device 120 may identify frames of the video data (e.g., portions of the video data) associated with the range of time associated with the highest measure of relevance. Video summary device 120 may determine an order in which the frames were provided in the video data. As an example, video summary device 120 may identify sequence information identifying a sequence of each frame in the video data. For instance, video summary device 120 may identify the sequence information of a frame of the video data based on metadata of the frame. Video summary device 120 may order the frames of the video data in an order that is based on the sequence information. Video summary device 120 may generate the video summary by generating a file that includes the ordered frames. Video summary device 120 may encode the frames of the video data to generate the video summary. For example, video summary device 120 may encode the frames using a video codec.

In some implementations, the video summary may be an animated preview. The video summary may be a graphics interchange format file, a WebP file, a moving picture experts group (MPEG) file (e.g., MPEG-4 Part 14), among other examples. In some implementations, video summary device 120 may store the video summary in a memory associated with video summary device 120 (e.g., store the video summary in a file storage service).

As shown in FIG. 1F, and by reference number 175, video summary device 120 may provide the video summary. For example, video summary device 120 may provide the video summary to client device 130. In some implementations, video summary device 120 may provide the video summary to client device 130 based on a trigger, such as a request from client device 130 and/or a request from machine 105, among other examples. Additionally, or alternatively, video summary device 120 may provide the video summary to client device 130 periodically.

In some implementations, client device 130 may enable a user to play the video summary while hovering over a video event thumbnail, associated with the video data, on a replay timeline. The video summary may provide context regarding events captured by the video data and enable the user to understand the events.

In some examples, video summary device 120 may generate multiple video summaries and provide the video summaries, to the user, as a compilation of the most relevant videos of the operator. In this regard, the video summaries may help a fleet manager, associated with machine 105, to quickly understand an overall behavior of the operator without viewing an entirety of the video data and/or without in-depth investigation of events captured by the video data. In some examples, an amount of data of the video summary may facilitate sharing the video summary (e.g., via e-mails and/or text messages, among other examples).

In some implementations, video summary device 120 may be part of an edge computation environment. In this regard, video summary device 120 may generate the video summary in real time (or near real time) and share the video summary in a timely manner (e.g., within a few seconds of one or more occurrences of one or more of the events discussed above). The video summary may enable a user to easily identify a manner in which the one or more events may be resolved (e.g., evaluate a type of assistance needed).

In some implementations, video summary device 120 may include an engine component configured to determine the plurality of events, determine the measures of relevance of the plurality of portions of time, and determine the measures of relevance of the ranges of time. Additionally, or alternatively, video summary device 120 may include a preview creator component configured to generate the video summary. While the foregoing examples have been described with respect to generating a video summary of video data obtained by a camera device of a vehicle, implementations described herein are applicable to generating a video summary of video data obtained by a camera device associated with different applications. For example, implementations described herein are applicable to generating a video summary of video data obtained by a camera device used in the security industry (e.g., security camera devices), by a camera device used in the healthcare industry, by a camera device used in the construction industry, among other examples of camera devices used in other industries. The video summary may be generated in a manner similar to the manner described above in connection with camera 110 of vehicle 105. By generating the video summary of the video data as described herein, video summary device 120 may preserve network resources, storage resources, and/or computing resources, among other examples, associated with obtaining, storing, and/or processing video data of a substantial length and of a substantial size.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
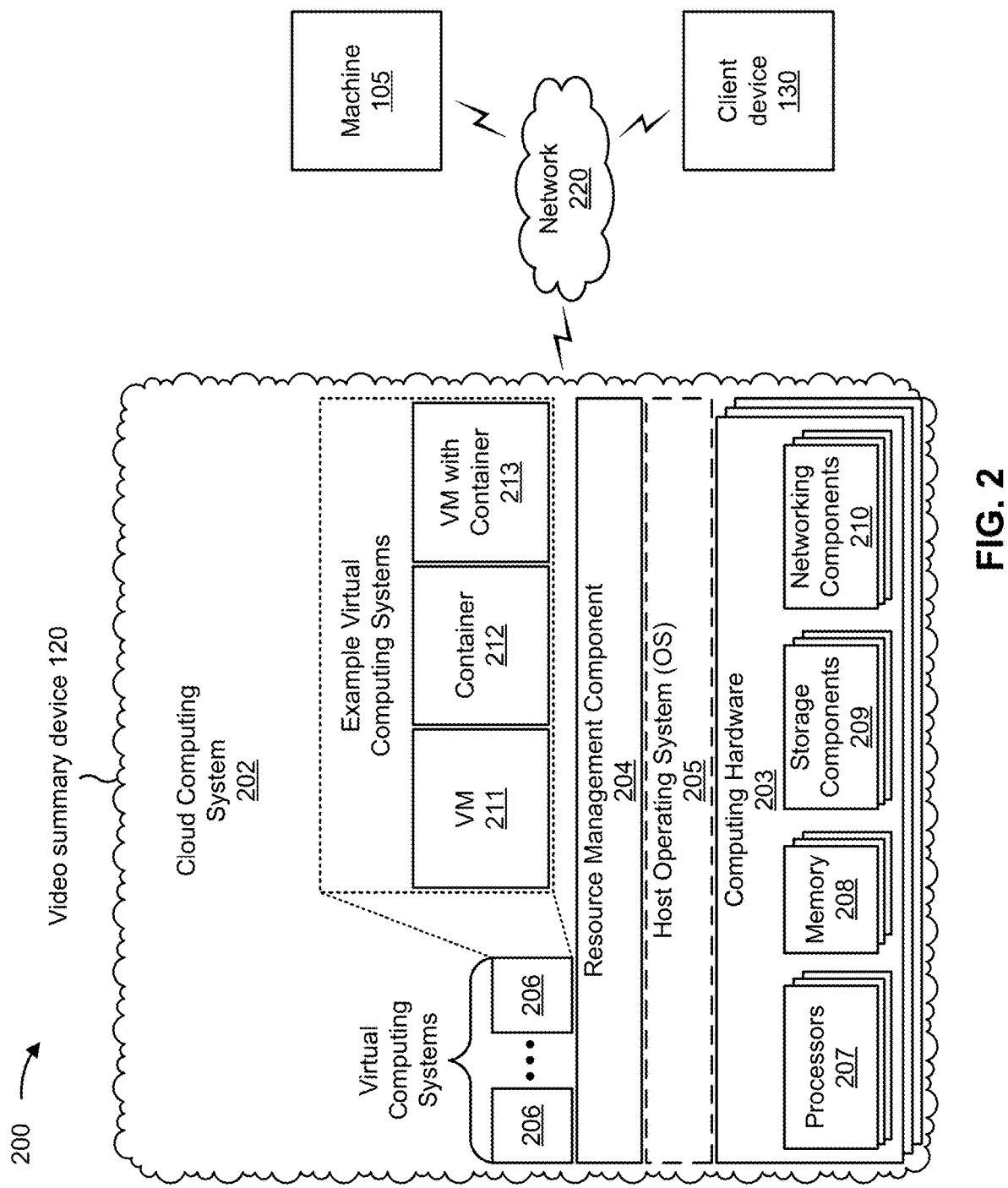
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a video summary device 120, which may include one or more elements of and/or may execute within a cloud computing system 202. The cloud computing system 202 may include one or more elements 203-213, as described in more detail below. As further shown in FIG. 2, environment 200 may include a machine 105, a network 220, and/or a client device 130. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the video summary device 120 may include one or more elements 203-213 of the cloud computing system 202, may execute within the cloud computing system 202, and/or may be hosted within the cloud computing system 202, in some implementations, the video summary device 120 may not be cloud-based (e.g., may be implemented outside of a cloud computing system) or may be partially cloud-based. For example, the video summary device 120 may include one or more devices that are not part of the cloud computing system 202, such as device 300 of FIG. 3, which may include a standalone server or another type of computing device. The video summary device 120 may perform one or more operations and/or processes described in more detail elsewhere herein.

As explained above, machine 105 may be a vehicle, such as a manned vehicle, an autonomous vehicle, or a semiautonomous vehicle. In some implementations, machine 105 may be an unmanned aerial vehicle. For example, machine 105 may be a drone. In some examples, a camera device 110 may include a traffic surveillance camera.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

Client device 130 includes one or more devices capable of receiving, generating, storing, processing, and/or providing information associated with a video summary, as described elsewhere herein. Client device 130 may include a communication device and a computing device. For example, client device 130 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
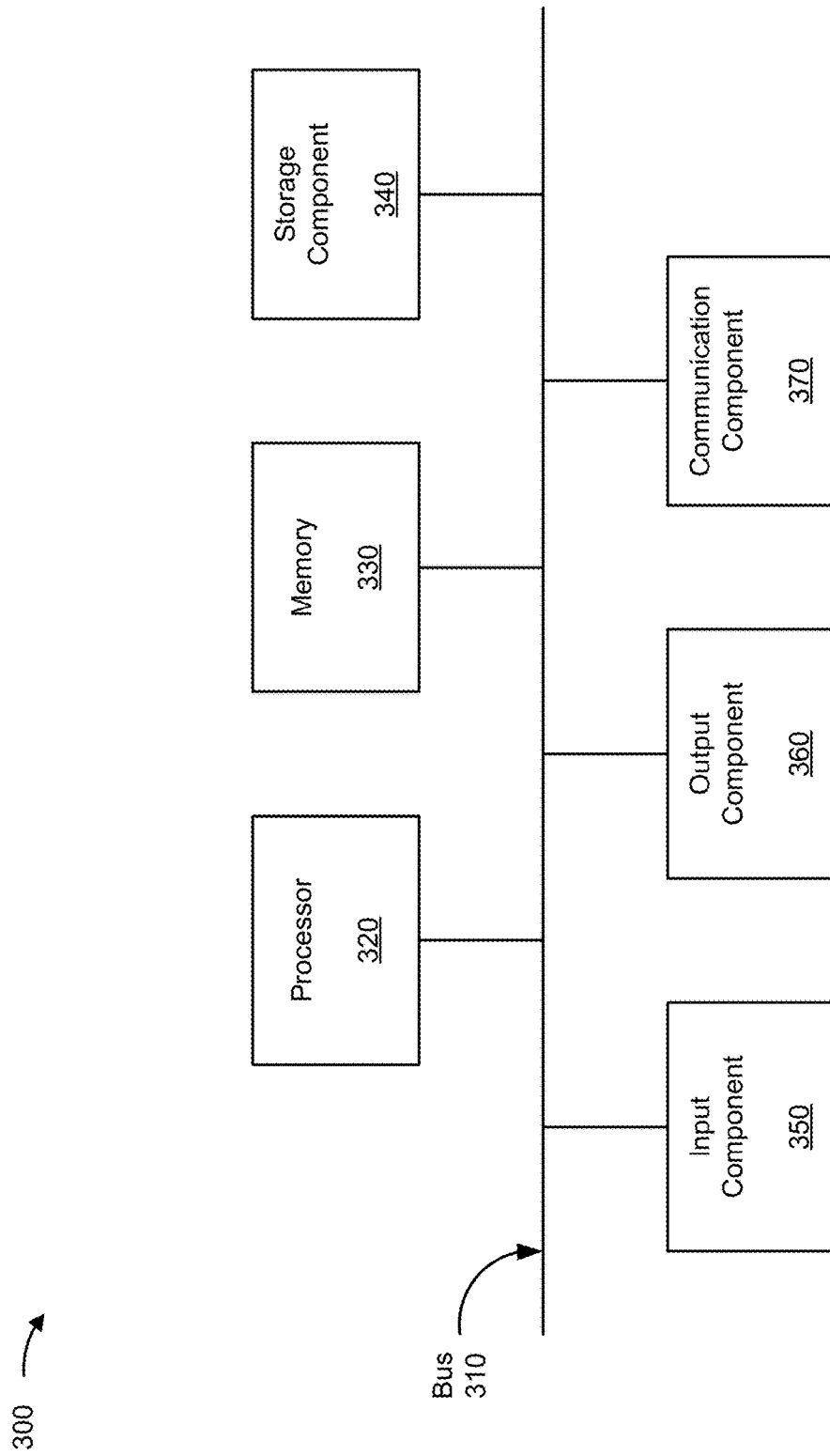
FIG. 3 is a diagram of example components of one or more devices of FIG. 2.

FIG. 3 is a diagram of example components of a device 300, which may correspond to video summary device 120, machine 105, and/or client device 130. In some implementations, video summary device 120, machine 105, and/or client device 130 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400. In some implementations, one or more process blocks of FIG. 4 may be performed by a video summary device (e.g., video summary device 130). In some implementations, one or more process blocks of FIG. 4 may be performed by another device or a group of devices separate from or including the video summary device, such as a machine 105 (e.g., machine 105) and/or a client device (e.g., client device 130). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include determining, based on video data captured over a period of time, a plurality of events that occurred during the period of time (block 410). For example, the video summary device may determine, based on video data captured over a period of time, a plurality of events that occurred during the period of time, as described above.

As further shown in FIG. 4, process 400 may include determining first measures of relevance of a plurality of portions of the period of time (block 420). For example, the video summary device may determine first measures of relevance of a plurality of portions of the period of time, wherein each portion of time, of the plurality of portions of the period of time, corresponds to one or more frames of the video data, and wherein a measure of relevance of a portion of time, of the plurality of portions of the period of time, is determined based on one or more events of the plurality of events that occurred during the portion of time, as described above. In some implementations, each portion of time, of the plurality of portions of the period of time, corresponds to one or more frames of the video data. In some implementations, a first measure of relevance of a portion of time, of the plurality of portions of the period of time, is determined based on one or more events of the plurality of events that occurred during the portion of time.

In some implementations, the video data is captured by one or more first devices associated with a vehicle, wherein the sensor data and the location data are obtained from one or more second devices associated with the vehicle, and wherein determining the plurality of events comprises determining one or more of an object detection event indicating a detection of one or more objects, an acceleration event indicating an acceleration of the vehicle, a distraction event indicating a distraction of an operator of the vehicle, a drowsiness event indicating a measure of drowsiness of the operator, a traffic violation event indicating a traffic violation associated with the vehicle, or a collision event indicating a collision involving the vehicle (e.g., a collision between the vehicle and another vehicle and/or a collision between the vehicle and an object, among other examples).

In some implementations, the one or more events are multiple events, and determining the first measures of relevance comprises determining different pairs of the multiple events, and determining the first measure of relevance of the portion of time based on the multiple events and the different pairs of the multiple events.

In some implementations, determining the first measures of relevance comprises determining a weight associated with the portion of time based on historical data regarding the portion of time, and determining a first measure of relevance, of the first measures of relevance, for the portion of time based on the one or more events and the weight associated with the portion of time.

In some implementations, the one or more events are multiple events, and determining the first measures of relevance includes determining different combinations of the multiple events; determining factors for the different combinations, wherein a factor, for a combination of a first type of event and a second type of event, is based on a relation between the first type of event and the second type of event; and determining the first measure of relevance of the portion of time based on the multiple events, the different combinations of the multiple events, and the factors.

As further shown in FIG. 4, process 400 may include determining second measures of relevance of a plurality of ranges of time between different portions of time of the plurality of portions of the period of time (block 430). For example, the video summary device may determine second measures of relevance of a plurality of ranges of time between different portions of time of the plurality of portions of the period of time, wherein the second measures of relevance are determined based on the first measures of relevance determined for the different portions of time, as described above. In some implementations, the second measures of relevance are determined based on the first measures of relevance determined for the different portions of time.

In some implementations, determining the second measures of relevance comprises determining a range of time between a first portion of time and a second portion of time of the different portions of time, and determining a measure of relevance of the range of time between the first portion of time and the second portion of time based on the measure of relevance, of the first measures of relevance, determined for each portion of time included the range of time.

In some implementations, determining the measure of relevance of the range of time comprises determining a factor based on a desired length of the video data, and determining the measure of relevance of the range of time based on the factor and the measure of relevance determined for each portion of time included the range of time.

As further shown in FIG. 4, process 400 may include determining particular frames of the video data corresponding to particular portions of time, of the plurality of portions of time, included in a particular range of time associated with a highest measure of relevance of the second measures of relevance (block 440). For example, the video summary device may determine particular frames of the video data corresponding to particular portions of time, of the plurality of portions of time, included in a particular range of time associated with a highest measure of relevance of the second measures of relevance, as described above.

As further shown in FIG. 4, process 400 may include providing the particular frames as a video summary of the video data (block 450). For example, the video summary device may provide the particular frames as a video summary of the video data, as described above.

In some implementations, process 400 includes receiving sensor data obtained during the period of time, receiving location data obtained during the period of time, and determining the plurality of events comprises determining the plurality of events based on the video data, the sensor data, and the location data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a video summary device, the method comprising:
   determining, based on video data captured over a period of time, a plurality of events that occurred during the period of time;
   determining first measures of relevance of a plurality of portions of the period of time,
      wherein each portion of time, of the plurality of portions of the period of time, corresponds to one or more frames of the video data, and
      wherein a first measure of relevance of a specific portion of time, of the plurality of portions of the period of time, is determined based on one or more events of the plurality of events that occurred during the specific portion of time;
   determining second measures of relevance of a plurality of ranges of time between different portions of time of the plurality of portions of the period of time,
      wherein the second measures of relevance are determined based on the first measures of relevance determined for the different portions of time;
   determining particular frames of the video data corresponding to particular portions of time, of the plurality of portions of the period of time, included in a particular range of time associated with a highest measure of relevance of the second measures of relevance; and
   providing the particular frames as a video summary of the video data.

2. The method of claim 1, further comprising:
   receiving sensor data obtained during the period of time;
   receiving location data obtained during the period of time; and
   wherein determining the plurality of events comprises:
      determining the plurality of events based on the video data, the sensor data, and the location data.

3. The method of claim 2, wherein the video data is captured by one or more first devices associated with a vehicle,
   wherein the sensor data and the location data are obtained from one or more second devices associated with the vehicle; and
   wherein determining the plurality of events of events comprises:

determining one or more of an object detection event indicating a detection of one or more objects, an acceleration event indicating an acceleration of the vehicle, a distraction event indicating a distraction of an operator of the vehicle, a drowsiness event indicating a measure of drowsiness of the operator, a traffic violation event indicating a traffic violation associated with the vehicle, or a collision event indicating a collision involving the vehicle.

4. The method of claim 1, wherein the one or more events are multiple events; and
wherein determining the first measures of relevance comprises:
determining different pairs of the multiple events; and
determining the first measure of relevance of the specific portion of time based on the multiple events and the different pairs of the multiple events.

5. The method of claim 1, wherein determining the second measures of relevance comprises:
determining a range of time between a first portion of time and a second portion of time of the different portions of time; and
determining a measure of relevance of the range of time between the first portion of time and the second portion of time based on a measure of relevance, of the first measures of relevance, determined for each portion of time included in the range of time between the first portion of time and the second portion of time.

6. The method of claim 5, wherein determining the measure of relevance of the range of time between the first portion of time and the second portion of time comprises:
determining a factor based on a desired length of the video data; and
determining the measure of relevance of the range of time between the first portion of time and the second portion of time based on the factor and the measure of relevance determined for each portion of time included the range of time between the first portion of time and the second portion of time.

7. The method of claim 1, wherein determining the first measures of relevance comprises:
determining a weight associated with each portion of time based on historical data regarding each portion of time; and
determining a measure of relevance, of the first measures of relevance, for each portion of time based on the one or more events and the weight associated with each portion of time.

8. A device, comprising:
one or more processors configured to:
receive video data captured over a period of time;
receive sensor data obtained during the period of time;
determine, based on the video data and the sensor data, a plurality of events that occurred during the period of time;
determine first measures of relevance of a plurality of portions of the period of time,
wherein each portion of time, of the plurality of portions of the period of time, corresponds to one or more frames of the video data, and
wherein a first measure of relevance of a specific portion of time, of the plurality of portions of the period of time, is determined based on one or more events of the plurality of events that occurred during the specific portion of time;
determine second measures of relevance of a plurality of ranges of time between different portions of time of the plurality of portions,
wherein the second measures of relevance are determined based on the first measures of relevance determined for the different portions of time;
determine particular frames of the video data corresponding to particular portions of time of the different portions of time,
wherein the particular portions of time are included in a particular range of time associated with a highest measure of relevance of the second measures of relevance; and
provide the particular frames as a video summary of the video data.

9. The device of claim 8, wherein the video data and the sensor data are received from one or more devices, and
wherein the one or more processors, to provide the particular frames as the video summary, are configured to:
provide the particular frames as the video summary to a client device associated with the one or more devices.

10. The device of claim 8, wherein the one or more processors, to determine the second measures of relevance, are configured to:
determine the different portions of time based on a particular length of time,
wherein each range of time, of the plurality of ranges of time, is less than the particular length of time.

11. The device of claim 8, wherein the one or more processors, to determine the second measures of relevance of the plurality of ranges of time between the different portions of time, are configured to:
determine a factor based on a desired length of the video data;
determine a range of time between a first portion of time and a second portion of time of the different portions of time; and
determine a measure of relevance of the range of time between the first portion of time and the second portion of time based on the factor and a measure of relevance, of the first measures of relevance, determined for each portion of time included the range of time between the first portion of time and the second portion of time.

12. The device of claim 11, wherein a value of the factor increases as the desired length of the video data decreases.

13. The device of claim 8, wherein the one or more processors, to determine the first measures of relevance, are configured to:
determine a weight associated with each portion of time based on historical data regarding a quantity of times each portion of time was viewed; and
determine a first measure of relevance, of the first measures of relevance, for each portion of time based on the one or more events and the weight associated with each portion of time.

14. The device of claim 8, wherein the one or more events are multiple events, and wherein the one or more processors, to determine the first measures of relevance, are configured to:
determine different combinations of the multiple events;
determine factors for the different combinations,
wherein a factor, for a combination of a first type of event and a second type of event, is based on a relation between the first type of event and the second type of event; and determine the first measure of relevance of each portion of time based on the multiple events, the different combinations of the multiple events, and the factors.

15. A non-transitory computer-readable medium storing a set of instructions, the set of instructions comprising:
one or more instructions that, when executed by one or more processors of a device, cause the device to:
receive video data obtained during a period of time;
analyze the video data to identify a plurality of events that occurred during the period of time;
determine first measures of relevance of a plurality of portions of the period of time,
wherein each portion of time, of the plurality of portions of the period of time, corresponds to one or more frames of the video data, and
wherein a first measure of relevance of a specific portion of time, of the plurality of portions of the period of time, is determined based on one or more events of the plurality of events that occurred during the specific portion of time;
determine one or more second measures of relevance of one or more ranges of time between different portions of time of the plurality of portions of the period of time,
wherein the one or more second measures of relevance are determined based on the first measures of relevance determined for the different portions of time; and
determine, as a video summary of the video data, particular frames of the video data corresponding to particular portions of time of the different portions of time,
wherein the particular portions of time are included in a particular range of time associated with a highest measure of relevance of the second measures of relevance.

16. The non-transitory computer-readable medium of claim 15, wherein the video data is received from one or more first devices, and
wherein the one or more instructions, when executed by the one or more processors, further cause the device to:
provide the particular frames as the video summary to one or more second devices associated with the one or more first devices.

17. The non-transitory computer-readable medium of claim 15, wherein the one or more instructions, that cause the device to determine the second measures of relevance, cause the device to:
determine the different portions of time based on a particular length of time.

18. The non-transitory computer-readable medium of claim 15, wherein the one or more instructions, that cause the device to determine the first measures of relevance, cause the device to:
determine a weight associated with each portion of time based on historical data regarding each portion of time; and
determine a first measure of relevance, of the first measures of relevance, for each portion of time based on the one or more events and the weight associated with each portion of time.

19. The non-transitory computer-readable medium of claim 15, wherein the one or more events are multiple events, and wherein the one or more instructions, that cause the device to determine the first measures of relevance, cause the device to:
determine different combinations of the multiple events;
determine factors for the different combinations; and
determine the first measure of relevance of each portion of time based on the multiple events, the different combinations of the multiple events, and the factors.

20. The non-transitory computer-readable medium of claim 15, wherein the video data is captured by one or more devices associated with a vehicle,
wherein the one or more instructions, that cause the one or more devices to determine the plurality of events, cause the one or more devices to:
determine one or more of an object detection event indicating a detection of one or more objects, an acceleration event indicating an acceleration of the vehicle, a distraction event indicating a distraction of an operator of the vehicle, a drowsiness event indicating a measure of drowsiness of the operator, a traffic violation event indicating a traffic violation associated with the vehicle, or a collision event indicating a collision involving the vehicle.

* * * * *